United States Patent
Wu et al.

(10) Patent No.: US 7,539,288 B2
(45) Date of Patent: May 26, 2009

(54) APPARATUS AND METHOD FOR SIMULATING A TRUNK GATEWAY IN A TELECOMMUNICATIONS SWITCH TEST SYSTEM

(75) Inventors: Matt Wu, Plano, TX (US); Xiao-Gang Zhou, Plano, TX (US); Ju-Hsin Lin, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 11/280,486

(22) Filed: Nov. 16, 2005

(65) Prior Publication Data

US 2007/0110219 A1 May 17, 2007

(51) Int. Cl.
*H04M 1/24* (2006.01)
*H04L 12/50* (2006.01)
(52) U.S. Cl. .................. 379/10.01; 379/15.01; 370/382
(58) Field of Classification Search ... 379/10.01–10.02, 379/12–13, 15.01, 9, 26.01; 370/352–356
See application file for complete search history.

(56) References Cited

U.S. PATENT DOCUMENTS

| | | | |
|---|---|---|---|
| 6,351,521 B1 * | 2/2002 | DuRee et al. | 379/15.01 |
| 6,681,217 B1 * | 1/2004 | Lewak | 707/3 |
| 6,987,837 B1 * | 1/2006 | Blank et al. | 379/10.01 |
| 7,116,759 B2 * | 10/2006 | Wright et al. | 379/10.01 |
| 7,124,335 B2 * | 10/2006 | Choi et al. | 714/712 |

* cited by examiner

Primary Examiner—Suhan Ni

(57) ABSTRACT

A trunk gateway simulator for use in testing a telecommunications switch includes a message receiver, a message handler, and a message transmitter. Upon receipt of a message from a telecommunications switch, the trunk gateway simulator creates an instance of the message handler in a thread to generate a response message. Once generated, the response message is transmitted to the telecommunications switch. The trunk gateway simulator may operate as a stateless device, generating a response message in accordance with a received message without reference to previous received messages. The trunk gateway simulator may employ regular expressions in parsing received messages. The trunk gateway simulator may collect statistical information on one or more attributes of the received messages.

20 Claims, 4 Drawing Sheets

US 7,539,288 B2

APPARATUS AND METHOD FOR SIMULATING A TRUNK GATEWAY IN A TELECOMMUNICATIONS SWITCH TEST SYSTEM

TECHNICAL FIELD OF THE INVENTION

The present application relates generally to simulators for use in telecommunications switch testing and, more specifically, to a trunk gateway simulator for use in a telecommunications switch test system.

BACKGROUND OF THE INVENTION

Modern telecommunications switches, such as Softswitches, are capable of handling very large volumes of voice and data traffic received from, or directed to, different types of interfaces. For example, on a first interface, a switch may handle plain old telephone system (POTS) call traffic to or from a media gateway that serves POTS phones and other POTS devices. On another interface, the switch may handle publicly switched telephone network (PSTN) call traffic received from or directed to ISUP trunk lines. On still another interface, the switch may handle Session Initiation Protocol (SIP) call traffic received from or directed to an Internet protocol (IP) network.

In order to verify the operation of a telecommunications switch prior to deployment in a communication network, different types of simulators may be used to simulate call traffic to or from the switch. For example, a POTS simulator may be used to simulate a large volume of POTS call traffic into and out of a telecommunications switch. Likewise, a SIP simulator may be used to simulate a large volume of SIP call traffic.

However, conventional methods of testing the trunk gateway interface of a switch typically involve coupling a large number of actual trunk gateways to the telecommunication switch in order to simulate a high volume of PSTN call traffic. This is a prohibitively expensive means for testing a switch.

Therefore, there is a need in the art for an improved test system for telecommunication switches. In particular, there is a need for a trunk gateway simulator that is capable of supporting a significant volume of call traffic.

SUMMARY OF THE INVENTION

A trunk gateway simulator capable of supporting a high volume of BHCA ISUP traffic for use in testing a telecommunications switch is provided. The trunk gateway simulator comprises a message receiver for receiving messages from a telecommunications switch, a message handler for generating response messages in accordance with the received message, and a message transmitter for transmitting the response message to the telecommunications switch. For each message received from the telecommunications switch, the trunk gateway simulator creates an instance of the message handler in a thread to generate a response message. Once generated by the message handler, the response message is transmitted to the telecommunications switch by the message transmitter.

A method for simulating a trunk gateway for use in testing a telecommunications switch is provided. The steps of the method include receiving a message from a telecommunications switch and creating a message handler in a thread. The steps further include parsing the received message and generating a response message in accordance with the parsed received message. Finally, the steps include transmitting the response message to the telecommunications switch.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunications network.

Figure 1:
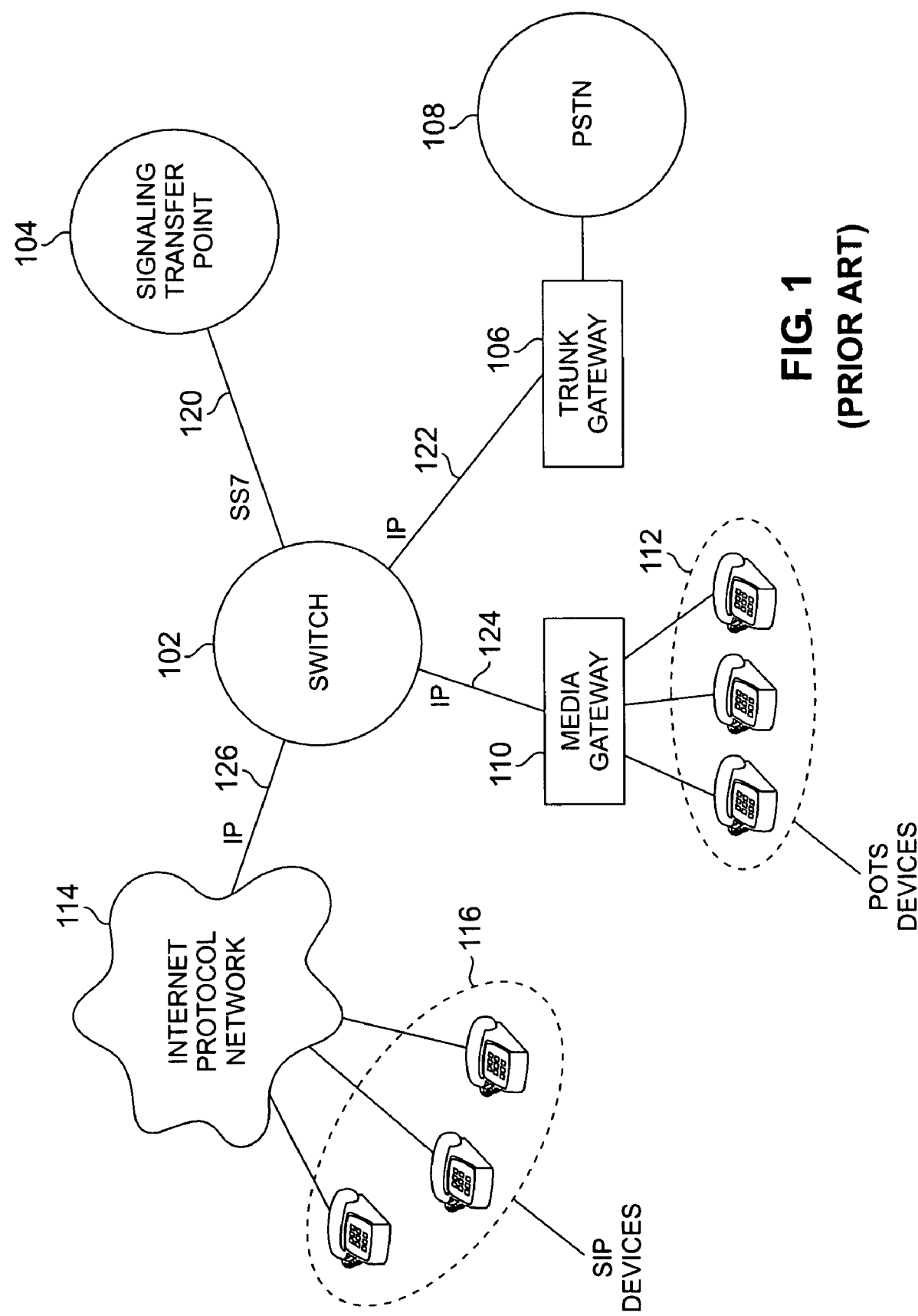
FIG. 1 illustrates a conventional packet switched telecommunications system that includes a telecommunications switch according to an exemplary embodiment of the prior art.

FIG. 1 illustrates a conventional packet switched telecommunications system 100 that includes a telecommunications switch 102 according to an exemplary embodiment of the prior art. The telecommunications switch 102 may provide call connection services, call routing, and management functions such as provisioning, fault, billing, etc. The telecommunications switch 102 may exchange call-establishment, billing, routing, and information-exchange messages with other switches (not shown) through signaling transfer point 104. Such messages may be exchanged over communications link 120 using the Signaling System 7 (SS7) protocol.

Calls managed by the telecommunications switch 102 may originate and terminate in devices of different types employing different formats of media. For example, the telecommunications switch 102 may communicate with devices (not shown) connected to one or more switched-channel public switched telephone networks (PSTNs) 108 by way of a trunk gateway 106. Traffic between the telecommunications switch 102 and the PSTN 108 on communications link 122 includes high-bandwidth Integrated Services digital network User Part (ISUP) communications that may carry many simultaneous voice and data signals. Such traffic may be encoded in the Media Gateway Controller (MEGACO) protocol, the Media Gateway Controller Protocol (MGCP), or other suitable signaling protocol.

The telecommunications switch 102 may also communicate with individual "plain old telephone service" (POTS) devices 112 by way of communications link 124 and media gateway 110. For example, the media gateway 110 may notify the telecommunications switch 102 that one of the POTS devices 112 has gone off hook, and in response, the telecommunications switch 102 may command the media gateway 110 to play a dial tone to the off-hook POTS device.

Furthermore, the telecommunications switch 102 may communicate with Session Initiation Protocol (SIP) devices 116 through an Internet Protocol (IP) network 114 via communications link 126. SIP devices may offer other media services (e.g., video, chat, and the like) in addition to voice services. The telecommunications switch 102 may communicate with the trunk gateway 106, the media gateway 110, and the IP network 114 over communications links 122, 124 and 126, respectively, using the IP protocol.

Figure 2:
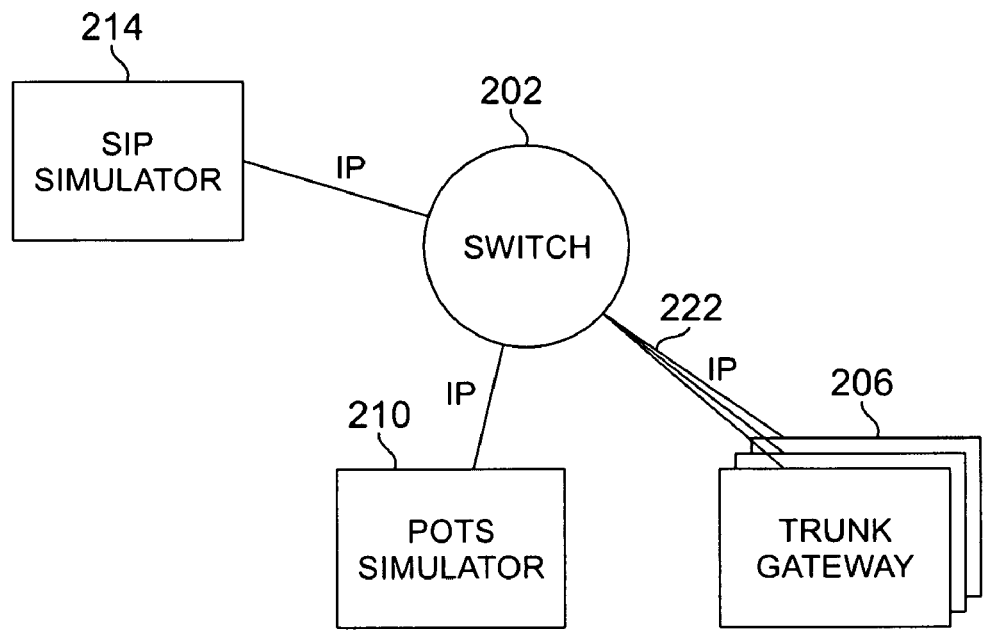
FIG. 2 illustrates a telecommunications switch test system according to one embodiment of the prior art.

FIG. 2 illustrates telecommunications switch test system 200 according to one embodiment of the prior art. Telecommunications switch test system 200 tests the call capacity and functionality of a telecommunications switch 202. A SIP simulator 214 may simulate traffic from SIP devices 116 communicating with the telecommunications switch 102 via the IP network 114. Similarly, a POTS simulator 210 may simulate messages from the media gateway 110 to the telecommunications switch 102. However, the high bandwidth traffic between the telecommunications switch 102 and the trunk gateway 106 has typically not been simulated, but rather provided in the test system 200 by a plurality of actual trunk gateways 206, each coupled to the telecommunications switch 202 by individual communication links 222.

The telecommunications switch 202 may be required to support trunk traffic of one million ISUP Busy Hour Call Attempts (BHCA). About 2000 trunks are required in the test system 200 to carry this level of traffic. Since each trunk gateway provides only about 60 trunks, more than 30 trunk gateways may be required to fully test the trunk traffic capacity of the telecommunications switch 202. Simulators such as those used for SIP traffic or media gateway traffic are unsuitable to simulate trunk gateway traffic because they cannot support the high volume of messages exchanged between the telecommunications switch 202 and the trunk gateways 206.

Figure 3:
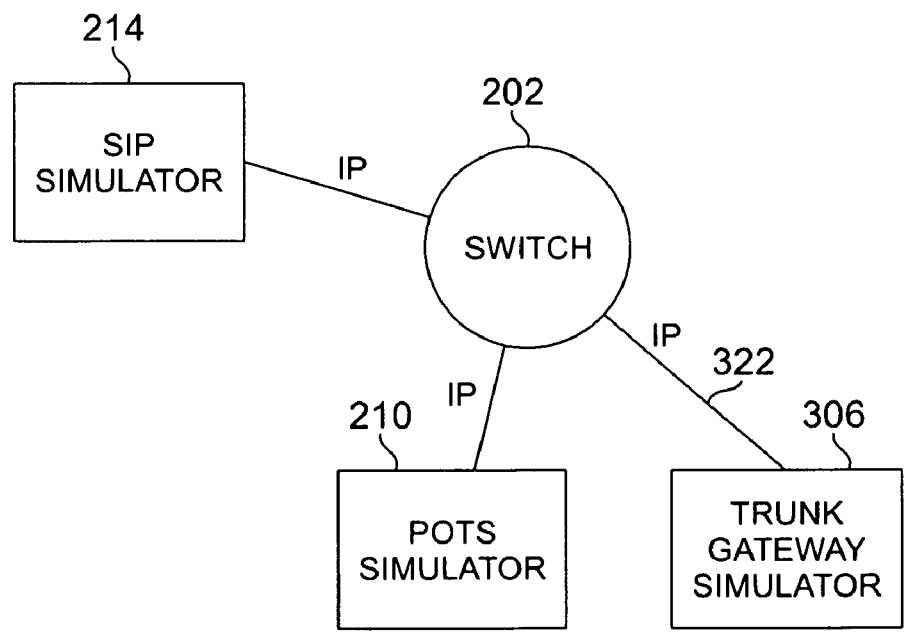
FIG. 3 illustrates a telecommunications switch test system according to an exemplary embodiment of the disclosure.

FIG. 3 illustrates a telecommunications switch test system 300 according to one embodiment of the disclosure. The test system 300 includes a telecommunications switch 202, a POTS simulator 210, and a SIP simulator 214, as described with reference to the test system 200 in FIG. 2. However, a trunk gateway simulator 306, communicating with the telecommunications switch 202 over a communication link 322, replaces the plurality of trunk gateways 206 and communication links 222 of the test system 200 of FIG. 2.

When implemented on a Netra™ 105 computer from Sun Microsystems, Inc., the trunk gateway simulator 306 may support as many as 500,000 BHCA. As a result, the single trunk gateway simulator of this embodiment of the disclosure may be used to replace as many as 16 trunk gateways in the test system 200, shown in FIG. 2.

Figure 4:
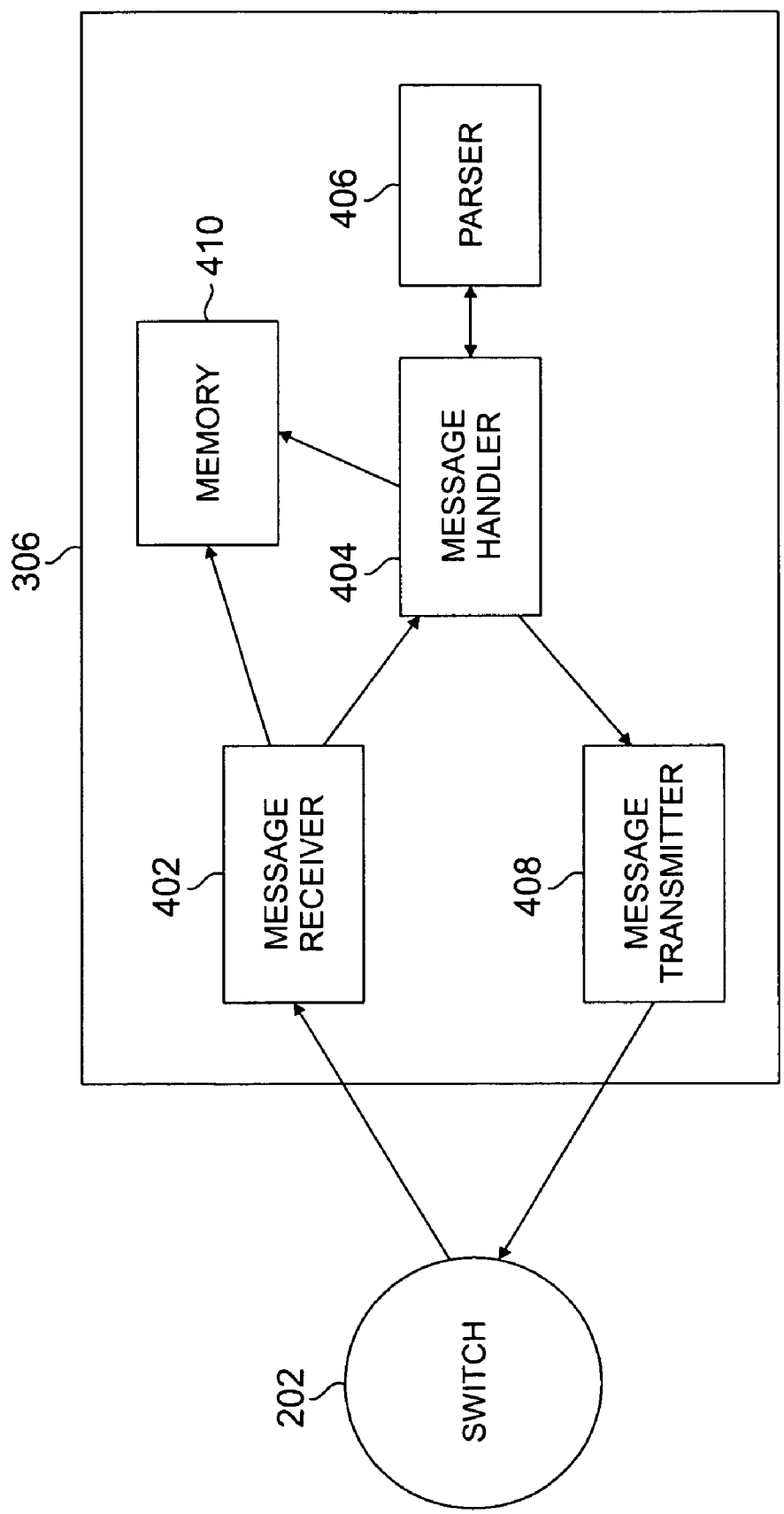
FIG. 4 illustrates a trunk gateway simulator according to an exemplary embodiment of the disclosure.

FIG. 4 illustrates trunk gateway simulator 306 according to an exemplary embodiment of the disclosure. The telecommunications switch 202 sends a first message intended for a trunk gateway to the trunk gateway simulator 306. The first message is received by a message receiver 402. In response to the receipt of the first message, the trunk gateway simulator 306 creates a first processing thread to execute a first instance of a message handler 404. The message handler 404 parses the first received message, using a parser 406, and generates a first response message in accordance with the first received message. Once the first instance of the message handler 404 has generated the first response message, the trunk gateway simulator 306 uses a message transmitter 408 to transmit the first response message to the telecommunications switch 202.

While the first instance of the message handler 404 is executing to handle the first received message, a second message may be received by the message receiver 402. If that happens, the trunk gateway simulator 306 creates a second processing thread to execute a second instance of the message handler 404. Like the first instance of the message handler 404, the second instance of the message handler 404 parses the second received message using the parser 406 and generates a second response message for the trunk gateway simulator 306 to transmit to the telecommunications switch 202 using the message transmitter 408.

The term "thread" is short for a thread of execution. Multiple threads may be executed in parallel in trunk gateway simulator 306. This multithreading may occur by time slicing (where a single processor switches between different threads) or by multiprocessing (where threads are executed on separate processors). Whichever threading technique is used, the first and second instances of the message handler 404, may execute in parallel in separate threads. This feature of the present embodiment of the disclosure allows the trunk gateway simulator 306 to handle a high volume of messages from the telecommunications switch 202.

From a received message, the parser 406 initially extracts information such as IP address, port number and message type. Depending upon the message type, the parser 406 may extract further information from the received message. For example, if the message type is a request, parameters such as transaction ID, context ID and endpoint name may be extracted from the message.

Once the parser 406 has extracted all appropriate information and/or parameters from a received message, the message handler 404 may generate a response message in accordance with the extracted information and/or parameters. For example, if the received message type is a resource allocation request, the message handler 404 may generate a new context ID based upon an endpoint name extracted from the received message. Where the telecommunications switch 202 is a Softswitch device, no two endpoints can have the same name, and no single endpoint name can be re-allocated without being released first. As a result, the message handler 404 may generate a unique context ID for each endpoint name it receives.

In this way, the trunk gateway simulator 306 may operate as a so-called stateless device. That is, where a series of messages are received from the telecommunications switch 202 relating to a single call being managed by the telecommunications switch 202, the trunk gateway simulator 306 need not retain any information relating to the state of the call between messages. As each message is received, it may be handled based entirely upon the information and/or parameters contained in the current received message, without reference to previous received messages associated with the same call. This feature of the present embodiment of the disclosure further enables the trunk gateway simulator 306 to handle a high volume of messages from the telecommunications switch 202.

The telecommunications switch 202 may encode the messages it sends to the trunk gateway simulator 306 in MEGACO, MGCP, or some other protocol using a regular grammar. In this situation, the parser 406 may use regular expressions to more efficiently parse a received message. However, it will be understood that other parsing techniques may also be used without departing from the scope of the present disclosure.

Returning to FIG. 4, the trunk gateway simulator may also include a memory 410 containing one or more counters or other accumulators of statistical information regarding one or more attributes of the messages received from the telecommunications switch 202. For example information regarding the total number of messages received, the last minute call rate, or the average call rate may be accumulated. Either the message receiver 402 or the message handler 404 may provide such information. A user interface (not shown) may be used to display or print the gathered statistical information regarding the one or more attributes of the messages received from the telecommunications switch 202.

Figure 5:
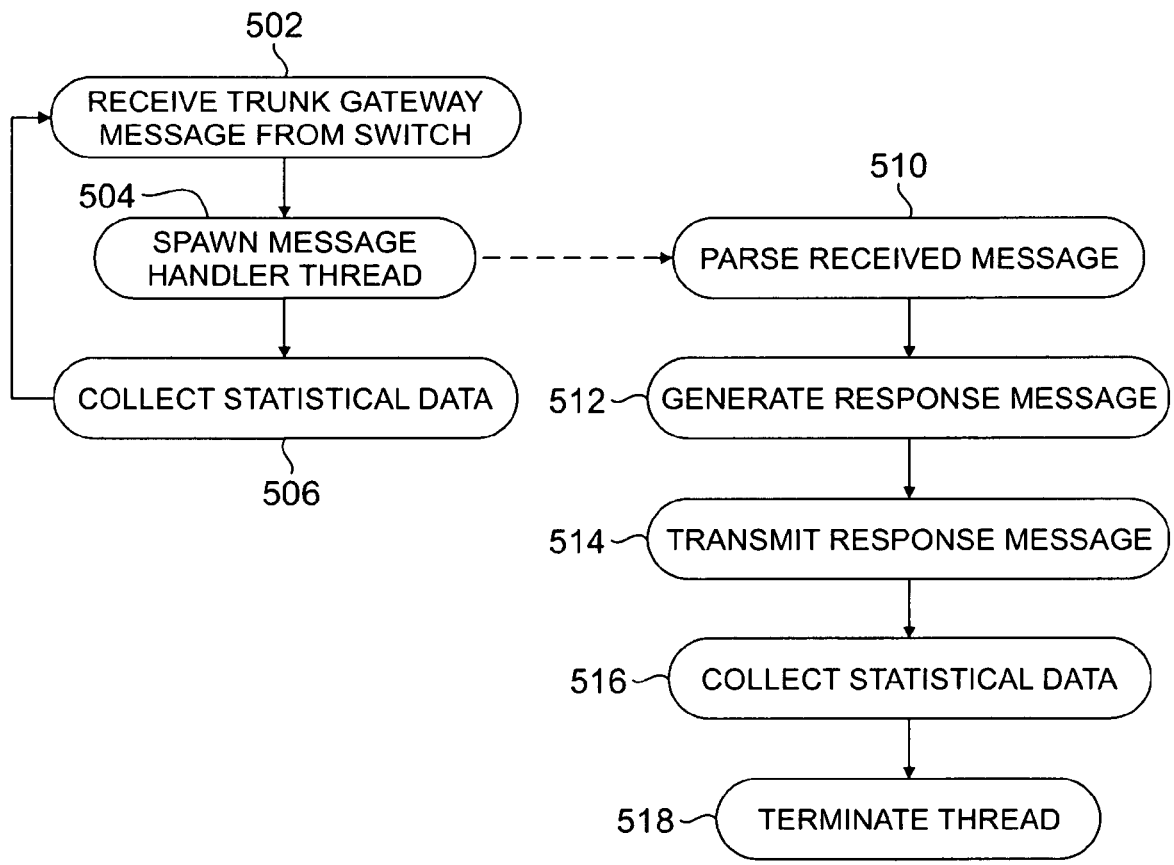
FIG. 5 is a flow diagram illustrating a trunk gateway simulation process according to an exemplary embodiment of the disclosure.

FIG. 5 presents a flow diagram of a process 500 that may be followed by the trunk gateway simulator 306, according to the present disclosure. At step 502, the message receiver 402 awaits a message from the telecommunications switch 202 intended for a trunk gateway. Upon receipt of the message, at step 504 the trunk gateway simulator 306 creates an instance of the message handler 404 in a thread. The trunk gateway simulator 306 may also collect in memory 410 statistical information on the message just received, at step 506. The trunk gateway simulator 306 then returns to step 502 to await another message.

At step 510, the message handler 404 uses the parser 406 to parse the received message. The parser 406 extracts from the received message information including the message type and may also extract one or more parameters from the message. In accordance with the extracted information and/or parameters, at step 512 the message handler 404 generates a response message. At step 514, the message transmitter 408 transmits the response message to the telecommunications switch 202. The message handler 404 may collect in memory 410 statistical information relating to one or more attributes of the parsed received message, at step 516.

Finally, at step 518, the thread executing the instance of the message handler 404 is terminated. Where the thread is simply an allocation of memory space, termination of the thread results in the release of the memory space allocated to the thread. Where the thread is one of a pool of thread resources managed by an operating system of the trunk gateway simulator 306, termination of the thread results in the return of the thread to the pool of available threads for subsequent allocation to another received message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of simulating a trunk gateway for use in testing a telecommunications switch, the method comprising the steps of:

receiving a plurality of messages intended for a trunk gateway from the telecommunications switch;

for each of the received messages, creating a message handler in a thread to process the received message by parsing the received message and generating a response message in accordance with the parsed received message, wherein the message handlers process the received messages in parallel with each other; and transmitting each of the response messages to the telecommunications switch.

2. The method as set forth in claim 1, wherein the received message and transmitted message are encoded in one of the MEGACO and MGCP protocols.

3. The method as set forth in claim 2, wherein the received message is parsed with a regular expression parser.

4. The method as set forth in claim 1, wherein the received message is associated with a call being managed by the telecommunications switch and the response message is generated without reference to a previous received message associated with the call.

5. The method as set forth in claim 1, wherein the step of parsing the received message further comprises extracting a parameter from the received message.

6. The method as set forth in claim 5, wherein the response message is generated in accordance with the extracted parameter.

7. The method as set forth in claim 1, further comprising the step of collecting statistical information on an attribute of a plurality of messages received from the telecommunications switch.

8. The method as set forth in claim 7, wherein the step of collecting statistical information further comprises storing the collected statistical information in a memory.

9. The method as set forth in claim 1, wherein the step of receiving a plurality of messages further comprises:

receiving a first message intended for a trunk gateway from the telecommunications switch; and receiving a second message intended for a trunk gateway from the telecommunications switch at a time subsequent to receiving the first message.

10. The method as set forth in claim 1, wherein the step of creating a message handler in a thread to process the received message comprises:

creating a message handler in a first thread to process the received first message; and creating a message handler in a second thread to process the received second message.

11. The method as set forth in claim 1, wherein the step of creating a message handler in a thread to process the received message further comprising allocating a space of memory for the thread.

12. For use in testing a telecommunications switch, a computer program embodied in a computer-readable medium, comprising:

instructions for receiving a message intended for a trunk gateway from a telecommunications switch;

instructions for creating a message handler in a thread;

instructions for parsing the received message;

instructions for generating a response message in accordance with the parsed received message; and instructions for transmitting the response message to the telecommunications switch.

13. The computer program as set forth in claim 12, wherein the received message is parsed with a regular expression parser.

14. The computer program as set forth in claim 12, wherein the received message is associated with a call being managed by the telecommunications switch and the response message is generated without reference to a previous received message associated with the call.

15. The computer program as set forth in claim 12, wherein the instructions for parsing the received message further comprise instructions for extracting a parameter from the received message.

16. The computer program as set forth in claim 15, wherein the response message is generated in accordance with the extracted parameter.

17. The computer program product as set forth in claim 12, further comprising instructions for collecting statistical information on an attribute of a plurality of messages received from the telecommunications switch.

18. The computer program product as set forth in claim 17, wherein the instructions for collecting statistical information are configured to store the collected statistical information in a memory.

19. The computer program product as set forth in claim 12, wherein the instructions for creating a message handler in a thread are configured to allocate a memory space for the thread.

20. The computer program product as set forth in claim 12, further comprising instructions for creating a parallel thread process.

* * * * *